United States Patent
McIan et al.

[11] Patent Number: 6,130,968
[45] Date of Patent: Oct. 10, 2000

[54] METHOD OF ENHANCING THE READABILITY OF RAPIDLY DISPLAYED TEXT

[76] Inventors: Peter McIan, 23229 Calvert St., Woodland Hills, Calif. 91367; Thomas W. Crosley, 19035 Brookview Dr., Saratoga, Calif. 95070

[21] Appl. No.: 08/943,766

[22] Filed: Oct. 3, 1997

[51] Int. Cl.$^7$ .............................. G06K 9/03; H04N 1/00; G09G 3/20; G06F 11/00

[52] U.S. Cl. ........................... 382/309; 382/310; 345/56; 358/406; 364/710.03; 371/2.1; 371/3

[58] Field of Search ..................................... 382/309, 310; 235/437; 345/56, 195; 358/406, 504; 364/710.03; 371/2.1, 3; 434/179, 180, 181, 182, 184

[56] References Cited

U.S. PATENT DOCUMENTS

| | | | |
|---|---|---|---|
| 3,878,327 | 4/1975 | Uhler | 434/179 |
| 3,938,139 | 2/1976 | Day | 434/179 |
| 4,001,561 | 1/1977 | Quaintance | 434/179 |
| 4,160,242 | 7/1979 | Fowler et al. | 434/179 |
| 4,359,730 | 11/1982 | Kunikane et al. | 345/56 |
| 4,493,531 | 1/1985 | Bohmer et al. | 349/143 |
| 4,613,945 | 9/1986 | Parker | 345/195 |
| 4,970,502 | 11/1990 | Kunikane et al. | 345/86 |
| 5,147,205 | 9/1992 | Gross et al. | 434/179 |
| 5,215,466 | 6/1993 | Rubio | 434/182 |
| 5,873,109 | 2/1999 | High | 707/517 |

*Primary Examiner*—Leo H. Boudreau
*Assistant Examiner*—Daniel G. Mariam
*Attorney, Agent, or Firm*—Robert J. Schaap

[57] ABSTRACT

A method of enhancing the readability of rapidly displayed text and with rapid apprehension, at a rate which is greater than the maximum unaided reading capability of that subject using the method. The method comprises a rapid and sequential moving of the words of text through a window on a screen of a computer monitor. In accordance with the method, the words are allowed to pass through or be displayed in the display window, one word at a time, and at a rate in which the time for display which is based on the number of characters in a word is related to and a function of the total amount of time required for all of the words in a segment of the text to be displayed. A time for display of each word of average character length is the same, and that certain words in a segment will be displayed for a longer period of time than other of the words. Usually, the words which contain more characters will have a longer display period. The present invention also provides an area on the screen of the monitor in which the previously read words of the segment of the text are printed as a full display, such that the reader may rapidly review the words of that segment previously presented on the window of the monitor, and then also rapidly scan entire portions of the text which have already been displayed. The method also involves the use of a selected color and patterned background, to enhance readability. In accordance with this method, the reading rate is substantially increased, and eye fatigue and strain is substantially reduced.

21 Claims, 2 Drawing Sheets

| WORD LENGTH CHARACTERS | RELATIVE DELAY |
|---|---|
| 1 - L | Y + 10 · len |
| > L | Y + 10 len + $Z_1 \cdot len^2 - Z_2 \cdot len$ |
| < L > 1 | |

FIG. 1

| | RELATIVE DELAY |
|---|---|
| END OF PHRASE: | ADD $C_1$ |
| END OF SENTENCE: | ADD $C_2$ |

FIG. 2

| WORD LENGTH | RELATIVE DELAY |
|---|---|
| 1 - 6 | 300 + 10 · len |
| > 6 | 300 + 10 len + $4 \cdot len^2 - 24 \cdot len$ |

FIG. 3

| | RELATIVE DELAY |
|---|---|
| END OF PHRASE: | ADD 150 |
| END OF SENTENCE: | ADD 250 |

FIG. 4

METHOD OF ENHANCING THE READABILITY OF RAPIDLY DISPLAYED TEXT

BACKGROUND OF THE INVENTION

1. Field of the Invention

This invention relates in general to certain new and useful improvements in rapidly displayed text for rapid reading, and more particularly, to a method of enhancing the readability of rapidly displayed text, and with an improved reading apprehension, one word at a time by using selected rates of display of the words of a text and selected modes of presentation.

2. Brief Description of the Related Art

Initially, and with the advent of personal computers, it was assumed that the computer would eliminate much of the paper used for conveyance of information and retention of information. In many ways, the reverse is true, in that the computer is responsible for generation of a greater volume of paper records. Nevertheless, one of the problems with computers in general is that the displays are too difficult for reading at a comfortable distance for any reasonable period of time. Naturally, if the screen is small, the letters are too small to read at a normal reading distance. If the screen is large, greater eye movement is required, thereby resulting in eye fatigue. In addition, the reader must manually press various keys, such as a "page-down" key or select other commands by actuating keys on the keyboard or using the mouse, to bring the next text into view. This necessarily requires periodic interruption of reading at arbitrary points within the text being read.

Research performed at the John Hopkins University has shown that reading rates can be increased by reducing eye movement. Those institutions offering speed-reading instruction have attempted to make use of reduced horizontal eye movement by causing students to read down the middle of a page. However, this still requires vertical eye movement, along with reading interruption when turning to the next page.

There are numerous diskettes and CD-Rom's containing the text of many books and other publicly available documents. Often times, they are accompanied by a text "reader", which displays the text of the book one screen at a time. Thus, the user must move their eyes across the entire screen to read the text, and manually advance to the next screen when reaching the bottom of a page. Some readers will allow for scrolling of the text continuously, and allowing the reader to adjust the rate at which the lines are scrolled. However, these readers do not take into account the differing amount of text per line. Moreover, the constant vertical scrolling is distracting, and the reader must still read an entire line across the screen horizontally, thereby again leading to eye fatigue.

The advances made in the enhancement of the readability of text have, in large measure, been a result of the availability of low cost personal computers. Many of the commercially available computers are capable of performing a variety of functions, such as printing with different types of fonts, and even allowing for the change of colors of the print on the screen of a monitor. In addition, many of the commercially available computers also allow for the change of the font size, either on the screen of the monitor or when printed. Further, these commercially available computers also provide for the drop-down of text, to show portions of the text in another window on the screen of the monitor. In substance, these commercially available computers can perform a variety of functions, both in the display of text and in the printing of text.

As a result of the recent expansive use of personal computers, there has been at least one attempt to provide a method of providing for the enhanced readability of text material. This attempt also relied upon rapid reading with words of text rapidly displayed in a window of the screen on a computer monitor. Although this attempt did provide for the rapid and sequential movement of words of text through a window on a screen of a computer monitor, it nevertheless suffered from several disadvantages.

In the one proposed rapid reading method thus far available, words were displayed sequentially, but at a fixed rate of speed. Each word was allowed the same presentation time on the monitor. Thus, for example, the article "a" was allowed the same amount of time as a word which may contain ten or more characters. The same held true of punctuation marks, which were recognized as words. This type of arrangement did not allow for a normal reading rate in accordance with a standard reading pattern of the average reading individual.

Other than this one attempt to enhance the readability rate of text as described above, there has not been any effective use of computers for this purpose. There are numerous proposed academic rapid reading courses. These academic courses rely upon techniques to improve the reading, as, for example, by scanning text and the like. They do not permit reading at a rate which is greater than the unaided reading capability of any individual. This one known attempt, which is at least partially effective for this purpose, does not recognize the necessity of permitting reading in accordance with the normal reading patterns of an individual, and hence, it loses a substantial amount of sufficiency, and frequently causes the user to become disenchanted with the system.

In addition, this one known method of providing for the reading of rapidly displayed text, relied upon a relatively flat standard computer screen background. As a result, and due to the fact that the text was being rapidly displayed, significant eye strain and eye fatigue resulted. Moreover, this system enabled the reader to adjust the display background at will, and which has now been found to be detrimental to enhancement of reading rate and reduction of eye fatigue.

There has been a need for a method for enhancing the readability of rapidly displayed text by a subject, and with an improved reading apprehension, and which is greater than the maximum unaided reading capability of a subject.

OBJECTS OF THE INVENTION

It is, therefore, one of the primary objects of the present invention to provide a method of enhancing the readability of rapidly displayed text by a subject and with improved reading apprehension, at a rate which is greater than the maximum unaided reading capability of that subject, and which approaches normal reading patterns.

It is another object of the present invention to provide a method of enhancing the readability of rapidly displayed text, of the type stated, in conjunction with the screen of a computer monitor for controlling the presentation of the text to a subject.

It is a further of the present invention to provide a method of enhancing the readability of rapidly displayed text, of the type stated, which provides for a display of words for a time duration which is a function of the character length of a word compared to the overall number of words to be displayed in a segment of the text to be displayed.

It is also an object of the present invention to provide a method of enhancing the readability of rapidly displayed text, of the type stated, in which a body of the text containing words previously read is displayed in a window separated from a window in which words are sequentially and rapidly presented.

It is yet another object of the present invention to provide a method of enhancing the readability of rapidly displayed text of the type stated, which utilizes a selected monitor background and a selected background for a window containing words presented for display.

It is another salient object of the present invention to provide a method of enhancing the readability of rapidly displayed text of the type stated, which can be operated on essentially any commercially available private home use computer or otherwise any standard mainframe computer.

It is yet another important object of the present invention to provide a method of enhancing the readability of rapidly displayed text by a subject, of the type stated, which is highly efficient in operation and has been shown to dramatically improve the reading capability and reading rate and to improve the reading apprehension of a subject.

With the above and other objects in view, my invention resides in the novel features and form and arrangement of the various method steps as set forth herein, and as described and pointed out in the claims.

BRIEF SUMMARY OF THE INVENTION

The present invention relates to a method of enhancing the readability of rapidly displayed text, by a subject, and at a rate which is greater than the maximum unaided reading capability of that subject. In this respect, most people are capable of reading at a maximum reading rate of 240 words per minute. Although a few individuals may have an exceptionally high reading rate, they rarely exceed this level by any significant amount.

The present invention is to be contrasted to and not confused with those academic approaches which rely upon a selection of key words in a sentence, and the scanning of sentences in a body of text. This invention is also to be contrasted to reading techniques which provide for reading down the center of the page. In many of these approaches, and although concepts are often picked up by a reader, a great deal of material is frequently unabsorbed by the reader. In those cases where the subject matter may contain important details, these academic prior art rapid reading processes are not feasible.

The present invention, on the other hand, relies upon a rapid and sequential display of words in a text, one word at a time. Moreover, the display is in accordance with an algorithm which has been developed, allowing the material to be read to be presented in a way which more fully approaches a natural reading pattern.

In accordance with the present invention, the words of a body of text are moved through a display window on the screen of a computer monitor, sequentially and one word at a time. Thus, in this invention, only one word of that text will appear at any point in time. The word is allowed to automatically pass through the display window at a display rate that is the word remains in the display window for a presentation time in which the number of characters in each word is related to and a function of the total amount of time required for all words in a segment of the text to be displayed. In other words, an examination of the words of a segment of the text in which the words are to be displayed will be made in order to determine, in advance, the time of display between each of the words in that segment and the blanking period (period between the words in which no display exists) between each of the words, prior to the display of the words in that segment. In this way the time of display of each of the words is generally the same, except that certain words having greater character length will be displayed for a longer time period than other words. As an example, words having a longer character length (e.g. number of characters) than the average character length of a word, will be given a greater amount of time for presentation on the screen of the monitor. However, words in the text which have a number of characters less than the average number of characters in a body of words can be displayed for a time period which is only slightly shorter than or approximately the same time period as the words having an average number of characters.

The reading method of the present invention has been adopted so as to more fully conform to the normal pattern of reading of an individual. In this respect, it has been found, in connection with the present invention, that words beginning with capital letters, other than at the beginning of a sentence, such as proper names and the like, are displayed for a period of time somewhat longer than the display time for each word having an average character length. Again, compensation is also made for punctuation marks. Additional time, referred to as a "delay time", is also allowed between phrases and between sentences in a body of text. Typically, and in accordance with the present invention, the words in the text are displayed at a rate which ranges from about sixty (60) words per minute to about eighteen hundred (1,800) words per minute.

Also in accordance with the present invention, the words of a segment are displayed at a size of two to ten times the normal character height of the text when displayed on a standard computer monitor. Further, and in a more preferred embodiment, the display size for the overall display including the display window as heretofore mentioned and a hereinafter described secondary display is 640 pixels by 580 pixels.

Also in a preferred embodiment of the invention, the words are displayed in a display window over a generally constant color background, and that the window is present over a background of constantly changing color. In a more preferred embodiment, the window may have pixels of gray and white in which the tone may vary, but does not generally change in that window. However, the white pixels create a type of star background for the words which are displayed. The window which receives rapidly sequentially presented words in the text is overlaid on a background which has a continuously slowly changing color. Generally, about four different types of color pixels are employed. However, in order to ensure that the entire screen is not changed rapidly, only twenty-five percent (25%) of the color pixels are changed at any point in time.

The present invention, in another aspect, relates to a method of enhancing the readability of rapidly displayed text by a subject, using the rapid and sequential display of words in a window on a computer monitor, along with a secondary display of a portion of the body of the text which had been previously presented. Thus, each of the words in a portion of the text, as a body of the text, is presented in an area of the display separated from the window which receives the rapid and sequential movement of words. In this way, a reader of the text may be reading the text in the rapidly changing display in that window at a high rate of speed and may also scan previously read words in the body of the text.

The present invention also utilizes the generation of a background of selected color on the screen of the monitor and where the color of that background will continuously and slowly change over time. A word presentation or word display window is then created on the background of selected color. This word presentation window, however, has a star-filled background, generally with white and gray pixels. It is against this backdrop that the words of the text are rapidly and sequentially moved through the word display window.

This invention possesses many other purposes and has other advantages which will be made more fully apparent from a consideration of the forms in which it may be embodied. A few preferred embodiments of the invention are illustrated in the accompanying drawings and described in more detail in the following detailed description of the invention. However, it should be understood that this detailed description and the accompanying drawings are set forth only for purposes of illustrating the general principles of the invention, and that the invention is therefore not to be taken in a limiting sense.

BRIEF DESCRIPTION OF THE DRAWINGS

Figure 5:
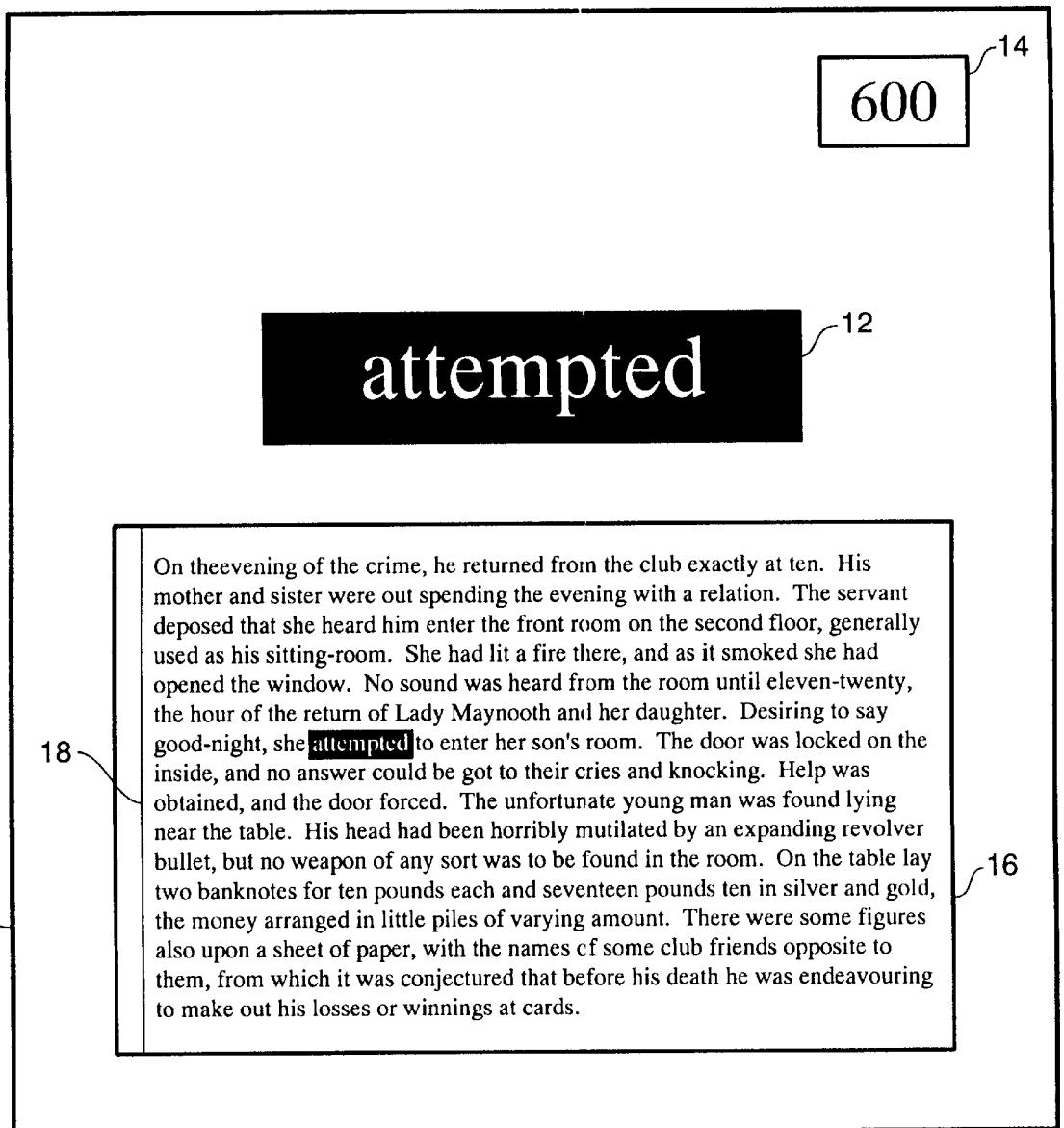

Having thus described the invention in general terms, reference will now be made to the accompanying drawings (two sheets) in which:

FIG. 1 is a schematic view of a chart showing the number of characters in a word and the formula for determining the relative delay or display rate of that word;

FIG. 2 is a schematic view of a chart showing the delays between ends of phrases and ends of sentences;

FIG. 3 is a schematic view of a chart showing a specific example of the delays or rates of display for words of given lengths;

FIG. 4 is a schematic view of a chart showing a specific example of relative delays for ends of phrases and ends of sentences; and FIG. 5 is a schematic view showing a display on the screen of a computer monitor in accordance with the present invention.

DETAILED DESCRIPTION OF A PREFERRED EMBODIMENTS

Referring now in more detail and by reference characters to the drawings which illustrate preferred embodiments of the present invention, the illustrated drawings will show the simple algorithms involved in the generation of delays or rates of display of words in accordance with the present invention, and also in a form in which the invention may appear on the screen of a computer monitor.

In accordance with the invention, words are displayed only in a graphics mode, and the characters of each of these letters and hence the words are in a size of approximately two times the normal character height, to approximately ten times the normal character height for a typical graphics mode. Thus, each display will have available a pixel size of approximately 640 pixels by 480 pixels. In the case of the present invention, text is displayed one word at a time, and in sequential format. The characters of those words are generated by the same techniques as are presently used for computer animation, that is, by first erasing old characters, redrawing a background on top of the erased characters, then redrawing a display window on the background, and then displaying new characters in the display window against that background.

The maximum rate at which words are displayed in accordance with the invention is limited by the re-fresh rate of display, and for a conventional computer, it is typically thirty frames per second, providing an upper limit of about 1,800 words per minute. Hence, 1,800 words per minute constitutes the maximum rate of display, although words can be displayed as slowly as desired. In the present invention, it is desirable to limit the lower end of the rate of display to one word per second (60 words per minute).

In accordance with the present invention, words of a text are generated individually and sequentially, and displayed on the screen of a monitor 10 as shown in FIG. 5, and in a window 12 generated on the screen of that monitor. Thus, each word is displayed for a fixed period of time in that window 12, which is typically referred to as a word display window. By using computer controls, as, for example, by setting a desired rate of speed using the keyboard of the computer, the user of the system can select a particular display rate of words which is shown in a generated display rate window 14. In this case, the user has selected a display rate of, e.g., 600 words per minute.

When the user starts to read the text, the user will actuate one of the input keys on the keyboard and start the display generation. The various words are displayed in that display window 12 for fixed time periods depending upon the length of the word. If all words were displayed at the same rate, it has been found that the user would probably miss some, if not several, of those words. As a result, longer words are displayed for a longer period of time than average length words. It has also been found that a word of average length contains six characters. A longer word, as, for example, a word containing ten characters, would be displayed for a longer time period. The extra delay for the longer word is proportional to the square of the excess length of that word.

Words which are shorter than an average length, as, for example, words containing less than six characters, typically articles, e.g., "an", are displayed for only slightly less than or nearly the same amount of time as the average length word. Otherwise, short words would not be visible. Proper nouns which are determined by words with capital letters at the beginning of the word, are displayed for twice the length of other words of the same length, regardless of the number of characters in that word. This is due to the fact that proper nouns, such as names of persons and names of places, are typically not recognized as quickly as other words.

In order to provide a proper rhythm and more closely adhere to a natural reading pattern, and also to adhere to an original pacing of text, a delay time is added at the end of a phrase which may be denoted by a comma or semicolon, or similar punctuation. In like manner, a delay time is included between the display of one word and next successive word, that is, the display time of a word, is increased when the word is enclosed in parentheses, or quotation marks. A delay time is also provided for sentences which ends with a period, question mark or exclamation mark.

FIG. 1 illustrates one algorithm which has been found to be effective in determining the display time of a word according to its character length. Those characters which are used in FIGS. 1 and 2 to represent unknown factors are defined as follows:

1) Y designates a length of time representing a delay between time of display of a word and the next successive word (blanking period) in the display window 12;

2) $Z_1$ represents a multiplying factor which is multiplied against the square of the number of characters in a word;

3) $Z_2$ represents another multiplying factor which is used for multiplication against the length of the word and used in the algorithm of FIG. 1;

4) $C_1$ represents a delay in milliseconds which is added to a display time at the end of a phrase; and 5) $C_2$ represents another relative time for a display of the end of a sentence or the delay period added to the end of a sentence and before the beginning of the next sentence.

FIGS. 3 and 4 show preferred display times in accordance with the invention. Thus, in a preferred embodiment, for words having a character length of one to six letters, the word should have a display time for 300 units, plus ten times the length of the word in numbers of characters. For words having a length of less than six characters, the time of display should be 300 units plus ten times the number of characters, plus four times the number of characters squared and minus 24 times the number of characters. The units of time previously mentioned are all relative numbers. They can be, for example, milliseconds although since the times are relative to one another, specific values are not required. In like manner, and in a preferred embodiment, the delay time at the end of a phrase or otherwise the time between the end of one phrase and the next successive phrase should be 50 units and the delay time or otherwise the time between two sentences should be 250 units.

Those factors as set forth in the tables of FIGS. 3 and 4 have been found to be the most preferred in accordance with the present invention. It can be observed that since the delay after every word is not a fixed period of time, the words cannot necessarily be displayed at a constant rate, as, for example, by words per minute. A user must be able to set up a target speed. As a result, the computer itself is programmed to look ahead for a period of time in terms of the number of words to be displayed. Thus, for example, the computer is programmed to "look ahead" at the number of words which would be displayed in a time period of one minute. Thereafter, the relative display time for each word and the time delays is based on those rules identified in FIGS. 1 and 2 with specific examples as set forth in FIGS. 3 and 4.

The total amount of time which is available, as, for example, 60,000 milliseconds, is divided by the total of the relative delays to achieve the average delay in milliseconds per unit of relative delay. As a specific example, if a target reading speed of 600 words per minute is to be achieved, the computer is programmed to look ahead 3,600 characters (not including spaces or punctuation) and operates on a standard word length of six characters per word. A relative delay is then assigned to the end of each word. Thus, if 360 is the time display for an average six character word, a ten character word would have a display time of 520 and an eight character proper noun would have a display time of 888. Assuming that the sum of these delays is 249,560, then dividing 60,000 by 249,560 provides a value of 0.2404 milliseconds per unit of time delay. A ten character word would therefore have a display time of 520 times 0.2404 milliseconds, or 125 milliseconds.

The above-identified formula for determining the time delay is somewhat similar to adding a variable amount of space between words to obtain a left justification and a right justification in a line of proportional text in a word processing program. The advance examination or "look ahead" for a minute's worth of characters based on a specific speed setting, is accomplished incrementally during the delays between each word. Any software program will use a separate timer from the computer in order to time delays between the words so that the display of the word is independent of the computer processor's own clock speed.

When words have an excessive character length in the display window, the font size is not necessarily changed. In this case, the words are broken at hypenation points where possible.

In accordance with the present invention, it is possible to teach the reading of words to a new reader or otherwise to dramatically increase the reading speed of an experienced reader. Even more preferably, it is possible to dramatically increase the reading speed of a person by using a computer format and which will increase that reading speed well beyond the unaided reading speed of the average individual.

In addition, it has also been found to be advantage to locate the word display window approximately two-thirds of the way from the bottom of the screen of the monitor. This has been found to increase apprehension and reduce eye fatigue. However, the window can be located in any desired position.

The font size which has been selected and the positions of the window as described above provide an optimum seating position from the screen of the monitor. The font size is fixed and is not alterable by the user of the system. In this way, the system has been rendered to be somewhat "fool-proof" in order reduce eye fatigue. However, as further indicated the font re-size can be varied for words of excessive length. As also indicated previously, approximately one-fourth of the color pixels in the screen are changed at any point in time. This can actually range from about one-eighth of the amount of pixels to be changed at any point in time to about one-half the total number of pixels.

It has also been determined that in accordance with the present invention, the user should be able to control the display speed. Thus, in accordance with one preferred embodiment of the invention, the use of the system and method of the invention can stop the high speed rate of display by actuating a key, such as the space bar on the keyboard or selecting another appropriate command from a menu which may be provided. When the high speed display is stopped, a second window is generated as for example, a text display window 16, as shown in FIG. 5. At this point in time, the user can literally edit or make notes on the text as displayed in the text display window 16. Thus, the user can use the mouse or other control keys to move around an entire body of text, set bookmarks or other characters and the like. It is also possible to highlight text in a reverse color as for example, when a mouse is moved across portions of the text. Further, the text may be underlined, etc.

The text display window often referred to as "a secondary window" has a vertical line located on the left-hand side, one character away from the left-hand edge. The user can operate either the mouse or a key on the keyboard and release within that space a bookmark at a place in the text. Other types of commands can also be used with the system of the present invention and which are available from both the keyboard and the mouse. These commands would allow the user to advance to any text to be yet displayed or any previously displayed text and note a bookmark or the like.

The user can also resume the reading of the text in high speed display where left off by actuating one or more keys such as the space bar. The user also has the option of increasing or decreasing the words per minute using the (+) and the (−) keys on the keyboard. The target reading rate, as indicated above, is displayed in the reading rate window 14.

It is also possible to control the computer by one or more push button switches which may be hand or foot operated by using the serial or parallel in-out ports on the computer. Thus, the reader could be engaged in another activity as for example, using an exercising bike while also operating the system of the invention. Additional switches and controls could be added for speed control and the like. Further, this type of remote control may also lend well to physically handicapped individuals with limited body movement.

In one of the important aspects of the present invention, the display window can display text in, for example, yellow characters if desired. However, the color of the text can be varied according to the parts of the speech. For example, articles, nouns, pronouns, etc. could be provided with different colors in the display. The parts of the speech are tagged in the input text for this purpose. The tags are not displayed on the screen, although they are used by the computer to generate the proper color display. After the word is displayed it can then be added to the secondary display such as in a text display window. This variation of the invention is highly effective in teaching reading skills.

In another embodiment of the invention, various colors presented on the screen of the monitor have been found to be important. Thus, in order to enhance visibility and reduce eye fatigue, the characters are displayed in the word display window 12 in yellow against a nearly black background and which is highly visible. In actuality, the background is not completely black but contains random white and grey pixels. The pixels are arranged to present a "star-field" that is, white dots appearing on a grey or grey/black background. Moreover, the star-field will change slowly over a period of time, that is, stars may be removed and added slowly or the positions of the stars, (the white pixels) may change slowly.

A major overall background area 20 in the screen of the computer monitor is comprised of a solid color of a pale hue. This color is generating by using the color palette of the computer display and preferably an 8 bit color scheme including a palette with 18 bit colors and 6 bits apiece for red, green and blue. This scheme could be applied to any display using an indexed color palette.

In accordance with a preferred embodiment using the color arrangement, the initial hue is preferably a light grey with equivalent red/green/blue values approximately one-half of the maximum values (e.g. 32/32/32). The various pale hues are constructed by randomly varying these color values above or below the base value by a few points as for example, 32/40/32, which would represent a greenish tint but which is still primarily grey. Again, the color arrangement will change slowly over a period of time.

It is preferable to change the color by only changing a selected number of the pixels at any point in time. It has been found in accordance with the present invention that by changing the colors at a rate of 25 percent of the pixels at any point in time, a slow color change is achieved and which does not interfere with the reading of the text by the user. Moreover, while unnoticed, it nevertheless reduces the possibility of eye fatigue.

It is also possible in accordance with the invention, to use a high speed text display window incorporated into a portable device, either a portable computer or similar device for use in a position distant from a personal computer (e.g. use at a beach or the like). In this case, the computer screen would be replaced by a pair of see-through monochrome LCD lenses. As for example, mounted in a pair of eye glasses. The text would appear to float in front of a persons eyes much in the manner of a heads-up-display in a fighter plane.

In accordance with this embodiment of the invention, any software would be incorporated as a firmware chip. The eye glasses would be connected to a portable computer via a flexible cable. This personal hand-held computer would contain batteries plus a number of buttons including on-off, start-stop, etc.

Thus, there has been illustrated and described a unique and novel method of enhancing the readability of rapidly displayed text by a subject and with improved reading apprehension and which therefore fulfills all of the objects and advantages which have been sought. It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention.

Having thus described the invention, what we desire to claim and secure by letters patent is:

1. A method of enhancing the readability of rapidly displayed text by a subject and with a high degree of apprehension, at a rate which is greater than the maximum reading capability of that subject, said method comprising:

a) rapidly and sequentially moving the words of the text through a display window on a monitor, one word at a time;

b) conducting an examination of a segment of the text in which each of the words are to be displayed in order to determine in advance the time of display of each of the words in that segment and a the blanking period between each of the words in which there is no display, prior to the display of words in that segment; and c) allowing each of the words to be automatically displayed in the display window for a time period in which the number of characters in each word is related to and a function of the total amount of time required for display of all of the words in a segment of the text as determined by said examination and that the time of display of each of the words having a length of an average number of characters is the same and that certain words of this segment will be displayed for longer time periods than other words in this segment.

2. The method of enhancing the readability of rapidly displayed text of claim 1 further characterized in that words in a segment of the text having more characters than other words in that segment are displayed for a longer period of time than words having a length of an average number of characters.

3. The method of enhancing the readability of rapidly displayed text of claim 2 further characterized in that words in a segment of the text having a number of characters which is less than the average number of characters in that segment are displayed for a time period only slightly shorter than or for the same period of time as words having a length of an average number of characters.

4. The method of enhancing the readability of rapidly displayed text of claim 2 further characterized in that words beginning with capital letters not at the beginning of a sentence are displayed for a period of time longer than the display time for each word having a length of an average number of characters.

5. The method of enhancing the readability of rapidly displayed text of claim 4 further characterized in that words beginning with capital letters are displayed for a period of time which is twice as long as those words having a length of an average number of characters.

6. The method of enhancing the readability of rapidly displayed text of claim 2 further characterized in that a delay period in display is created at ends of phrases or sentences and before the beginning of the next sequential phrase or sentence.

7. The method of enhancing the readability of rapidly displayed text of claim 1 further characterized in that the words in the text are displayed at a rate of sixty to eighteen hundred words per minute.

8. The method of enhancing the readability of rapidly displayed text of claim 1 further characterized in that the words of a segment are displayed at a size of two to ten times the character height of text displayed on a computer monitor.

9. The method of enhancing the readability of rapidly displayed text of claim 8 further characterized in that the display size for an entire display is 640 pixels by 480 pixels.

10. The method of enhancing the readability of rapidly displayed text of claim 1 further characterized in that the words are displayed in the display window over a generally constant color background and that the window is present over a background of constantly changing color.

11. The method of enhancing the readability of rapidly displayed text of claim 10 further characterized in that the window is present over a constantly changing background comprised of four different colors.

12. The method of enhancing the readability of rapidly displayed text of claim 11 further characterized in that the window is present over a constantly changing background comprised of four different colors and where one-fourth of the pixels of a color are changed at any point in time to obtain a slowly changed color.

13. The method of enhancing the readability of rapidly displayed text by a subject and with improved apprehension at a rate which is greater than the maximum reading capability of that subject, said method comprising:

a) rapidly and sequentially moving the words of the text through a display window on a monitor, one word at a time;

b) conducting an examination of the text in which each of the words in a segment are to be displayed in order to determine in advance the time of display of each of the words in that segment and the blanking period between each of the words in which there is no display, prior to the display of the words of that segment;

c) allowing each of the words to be automatically displayed in the display window for a time period in which the number of characters in each word is related to and a function of the total amount of time required for display of all of the words in a segment of the text; and d) presenting each of the words of that segment in a portion of the text to be presented as a body of the text in an area of the display separated from said window but simultaneously with the presentation of the words of that segment in the display window so that a reader of the text may be reading the text through the rapidly changing display in the window at a high rate of speed and may also scan previously read words or unread words in the body of the text.

14. The method of enhancing the readability of rapidly displayed text of claim 13 further characterized in that the area of the display for that body of the text is located beneath the window.

15. The method of enhancing the readability of rapidly displayed text of claim 13 further characterized in that the presentation of the body of the text is under the control of the reader using the method.

16. The method of enhancing the readability of rapidly displayed text of claim 13 further characterized in that the time of display of each of the words is the same except that certain words of a segment will be displayed for longer time period than other words in this segment.

17. The method of enhancing the readability of rapidly displayed text of claim 13 further characterized in that the method comprises controlling the speed of display of words in the window by the user of the method.

18. A method of enhancing the readability of rapidly displayed text by a subject and with a high degree of apprehension, at a rate which is greater than the maximum reading capability of that subject, said method comprising:

a) generating a monitor background of selected color on a screen of a computer monitor and where the color of the background continuously and slowly changes over time;

b) creating a window on the background of selected color and which window has a star field background with white and gray pixels;

c) rapidly and sequentially displaying the words of the text through a display window on a monitor one word at a time; and d) automatically changing the color of the monitor background using pixels having four different color values and causing only a selected number of pixels to change at any point in time.

19. The method of enhancing the readability of rapidly displayed text of claim 18 further characterized in that the method comprises assigning any of four different color values to each pixel and initially providing the same color values to all pixels to provide a solid color and changing the background color slowly from one pale hue to another.

20. The method of enhancing the readability of rapidly displayed text of claim 19 further characterized in that only twenty-five percent (25%) of the pixels are changed at any point in time.

21. The method of enhancing the readability of rapidly displayed text of claim 18 further characterized in that the method comprises allowing each of the words to pass through the display window at a rate in which the number of characters of each word is related to and a function of the total amount of time required for display of all of the words in a segment of the text such that the time of display of each of the words is the same except that certain words of this segment will be displayed for longer time periods than other words in this segment.

* * * * *